No. 738,274. Patented September 8, 1903.

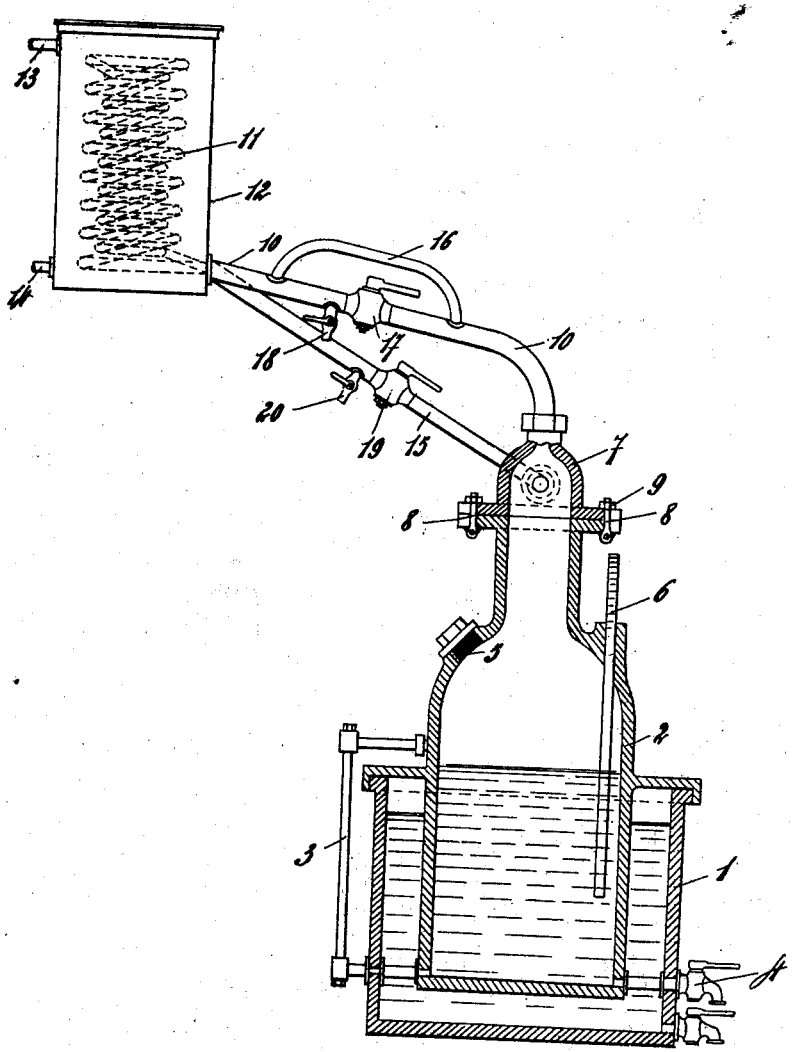

UNITED STATES PATENT OFFICE.

JEAN BARDIN, OF BRUSSELS, BELGIUM.

PROCESS OF MAKING PERFUMES AND DISINFECTANTS.

SPECIFICATION forming part of Letters Patent No. 738,274, dated September 8, 1903.

Application filed February 5, 1903. Serial No. 141,980. (No specimens.)

*To all whom it may concern:*

Be it known that I, JEAN BARDIN, a subject of the King of Belgium, residing at Brussels, in the Kingdom of Belgium, have invented certain new and useful Improvements in the Manufacture of Odoriferous, Antiseptic, and Disinfecting Substances, of which the following is a specification.

The object of the present invention is a process allowing the incorporation under particularly economic conditions of volatile substances possessing odoriferous, disinfecting, or antiseptic qualities with solidified alcohol, so as to form a solid, odoriferous, or disinfecting substance adapted to be easily molded into tablets, sticks, or any other shapes and in which the alcohol serves as a volatile or combustible vehicle. Perfumes, essences, and disinfecting or antiseptic substances cannot usually be incorporated with alcohol when solidified.

For carrying out the invention the process is as follows: The alcohol is heated for the necessary time with the substance intended to cause its solidification in a digester or similar apparatus connected to a cooler in which alcoholic vapors are condensed and afterward passed to the digester to prevent all loss of alcohol. When the solution is complete, the heating is interrupted, and the perfume or antiseptic substance to be incorporated with the solidified alcohol is separately dissolved in the ether. This mixture is then introduced into the digester after the alcohol contained therein has been brought to a comparatively much lower temperature by cooling. In this operation the ether employed volatilizes at the temperature of the alcohol and is entirely recovered in the cooler by means of a special arrangement of conduits connecting the digester with this cooler, which arrangement at this moment prevents the return of the condensed ether into the digester containing the mixture of alcohol and volatile substance and of substance for solidifying the alcohol.

The annexed drawing shows, partly in elevation and partly in section, a suitable apparatus for carrying out the process.

A receptacle 1 is used containing water for heating the digester 2 therein, which is provided with a level-gage 3, outlet-cock 4, filling-aperture closed by a plug 5, and thermometer 6, and closed at its upper part by a lid or cap 7, secured by hinge-bolts 8 and nuts 9. The digester 2 is connected by a pipe 10 with the coil 11 of the cooler 12, in which cold water circulates through inlet and outlet pipes 13 14. The coil 11 is connected at its other end with a pipe 15, leading back into the digester 2 and adapted to conduct into it the products of condensation. The first-mentioned pipe 10, leading from the digester 2 to the coil 11, is provided with a branch or by-pass 16 and contains a stop-cock 17 and an outlet-cock 18. The return-pipe 15 is also provided with a stop-cock 19 and outlet-cock 20. The alcohol is heated in the digester 2 with the substance for producing its solidification—for example, stearate or margarate of soda. During this operation the stop-cocks 17 19 in the pipes are kept open, so that the vaporized alcohol passes into the coil 11, is here condensed, and returns to the digester 2, the outlet-cocks 18 20 being kept closed. When the solution contained in the digester is sufficiently heated—that is to say, when the complete solution of the substance added to the alcohol is obtained—the stop-cocks 17 19 are closed and a certain quantity of ether containing the perfume or antiseptic or other substance to be incorporated with the solidified alcohol is introduced into the digester through the orifice of the plug 5. On contact with the still moderately-heated alcohol the ether volatilizes and passes through the pipe 10 and its branch or by-pass 16 into the cooling-coil 11, in which it is condensed. The condensed vapors collect partly in said pipe 10 between the part thereof connected to the coil 11 and its stop-cock 17 and partly in the return-pipe 15, between the end thereof connected with the coil 11 and its stop-cock 19.

When the operation is completed, it is sufficient to open the outlet-cocks 18 20 to recover the ether, which can afterward be used in the succeeding operation. The alcohol solution, volatile substance, and the substance for solidifying the alcohol are then withdrawn from the digester through its outlet-cock 11 and poured into suitable molds of tablet, stick, or other convenient shape.

The above-described process can be employed to advantage not only for the manufacture of solidified perfumes, disinfecting, or antiseptic substances incorporated with the alcohol, but also in a large number of pharmaceutical operations. By way of example of substances which may be treated the following are cited: belladona, arnica, cantharides, capsicum, eucalyptus, henbane, iodin, sublimate, salicylic acid, menthol, and the like.

What I claim is—

1. The process herein shown and described for incorporating perfumes, essences, disinfecting and antiseptic substances in solidified alcohol, consisting in heating the alcohol together with a substance intended to cause its solidification, dissolving separately the perfumes, essences, disinfecting and antiseptic substances in ether and then adding the solution of perfumes, essences, disinfecting and antiseptic substances in ether to the heated alcohol, substantially as and for the purpose set forth.

2. The process herein shown and described for incorporating perfumes, essences, disinfecting and antiseptic substances in solidified alcohol consisting in heating the alcohol together with a substance intended to cause its solidification until said substance is entirely dissolved, condensing the vapors of alcohol generated during said heating operation and returning the said condensed alcohol-vapors to the heated alcohol, then dissolving separately the perfumes, essences, disinfecting and antiseptic substances in ether then adding the solution of perfumes, essences, disinfecting and antiseptic substances in ether to the heated alcohol substance and finally condensing and recovering the vapors of ether generated through the contact of the ether mixture with the heated alcohol substantially as and for the purpose set forth.

3. The process herein shown and described for incorporating perfumes, essences, disinfecting and antiseptic substances in solidified alcohol, consisting in heating the alcohol together with a substance intended to cause its solidification, said heating operation being continued until said substance is entirely dissolved, condensing the vapors of alcohol generated during said heating operation and returning the said condensed alcohol-vapors to the heated alcohol, then dissolving separately the perfumes, essences, disinfecting and antiseptic substances in ether, then lowering the temperature of the heated alcohol, then adding the solution of perfumes, essences, disinfecting and antiseptic substances in ether to the still moderately-heated alcohol and finally condensing and recovering the vapors of ether generated through the contact of the ether mixture with the heated alcohol substantially as and for the purpose set forth.

4. The process herein shown and described for incorporating perfumes, essences, disinfecting and antiseptic substances in solidified alcohol, consisting in adding to a suitably-heated mixture of alcohol and of a substance adapted to cause its solidification, the perfumes, essences, disinfecting and antiseptic substances previously dissolved in ether substantially as and for the purpose set forth.

In witness whereof I have hereunto set my hand in presence of two witnesses.

JEAN BARDIN.

Witnesses:
 GEORGE BEDE,
 GREGORY PHELAN.